United States Patent

Carneheim et al.

(10) Patent No.: US 6,618,584 B1
(45) Date of Patent: Sep. 9, 2003

(54) TERMINAL AUTHENTICATION PROCEDURE TIMING FOR DATA CALLS

(75) Inventors: Caisa Carneheim, Ekero (SE); Marie Moynihan, Cork (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/651,856

(22) Filed: Aug. 30, 2000

(51) Int. Cl.[7] ............................................. H04M 1/66
(52) U.S. Cl. ...................... 455/411; 455/410; 455/435; 380/211; 380/247; 380/248; 380/249; 370/389
(58) Field of Search ................................. 455/411, 410, 455/435; 380/211, 247, 248, 249; 370/389

(56) References Cited

U.S. PATENT DOCUMENTS

| | | | |
|---|---|---|---|
| 5,625,869 A | 4/1997 | Nagamatsu et al. ........ 455/33.1 |
| 6,026,293 A | 2/2000 | Osborn ........................ 455/411 |
| 6,088,450 A | * 7/2000 | Davis et al. ................. 713/182 |
| 6,138,161 A | * 10/2000 | Reynolds et al. ............ 709/227 |
| 6,189,105 B1 | 2/2001 | Lopes .......................... 713/202 |
| 6,229,806 B1 | * 5/2001 | Lockhart et al. ............ 370/389 |
| 6,381,454 B1 | * 4/2002 | Tiedemann et al. ......... 455/419 |
| 6,449,473 B1 | * 9/2002 | Raivisto ...................... 455/410 |
| 2001/0019302 A1 | 9/2001 | Yatsu et al. .................. 340/5.2 |

OTHER PUBLICATIONS

International Search Report dated Apr. 4, 2002, for PCT application PCT/SE01/01833.

* cited by examiner

Primary Examiner—Nay Maung
Assistant Examiner—Alan T. Gantt
(74) Attorney, Agent, or Firm—Jenkens & Gilchrist, PC

(57) ABSTRACT

A subscriber terminal initiates an authentication procedure with a supporting wireless communications system in response to either a timer expiration based trigger, a state change based trigger, or a combination timer/state based trigger. With respect to the timer expiration based trigger, a countdown timer is set by either the subscriber terminal or the supporting system and thereafter monitored for expiration to trigger authentication. For the state change based trigger, the subscriber terminal monitors for any transition from an operating state wherein use of an air interface connection with the supporting system has been suspended to trigger authentication. Furthermore, for the combination timer/state based trigger, the subscriber terminal sets a countdown timer and monitors for an operating state transition that occurs subsequent to timer expiration to trigger authentication.

22 Claims, 3 Drawing Sheets

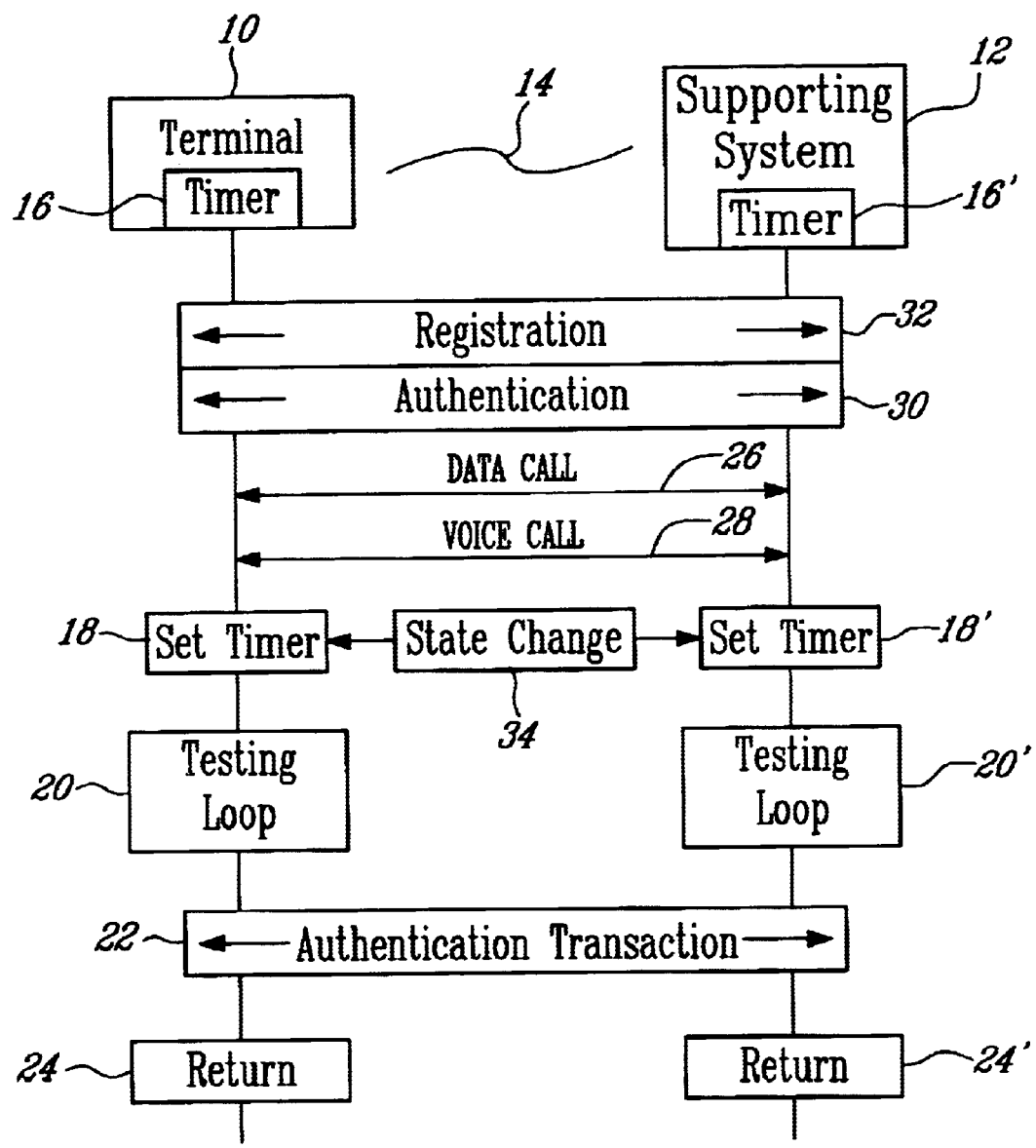

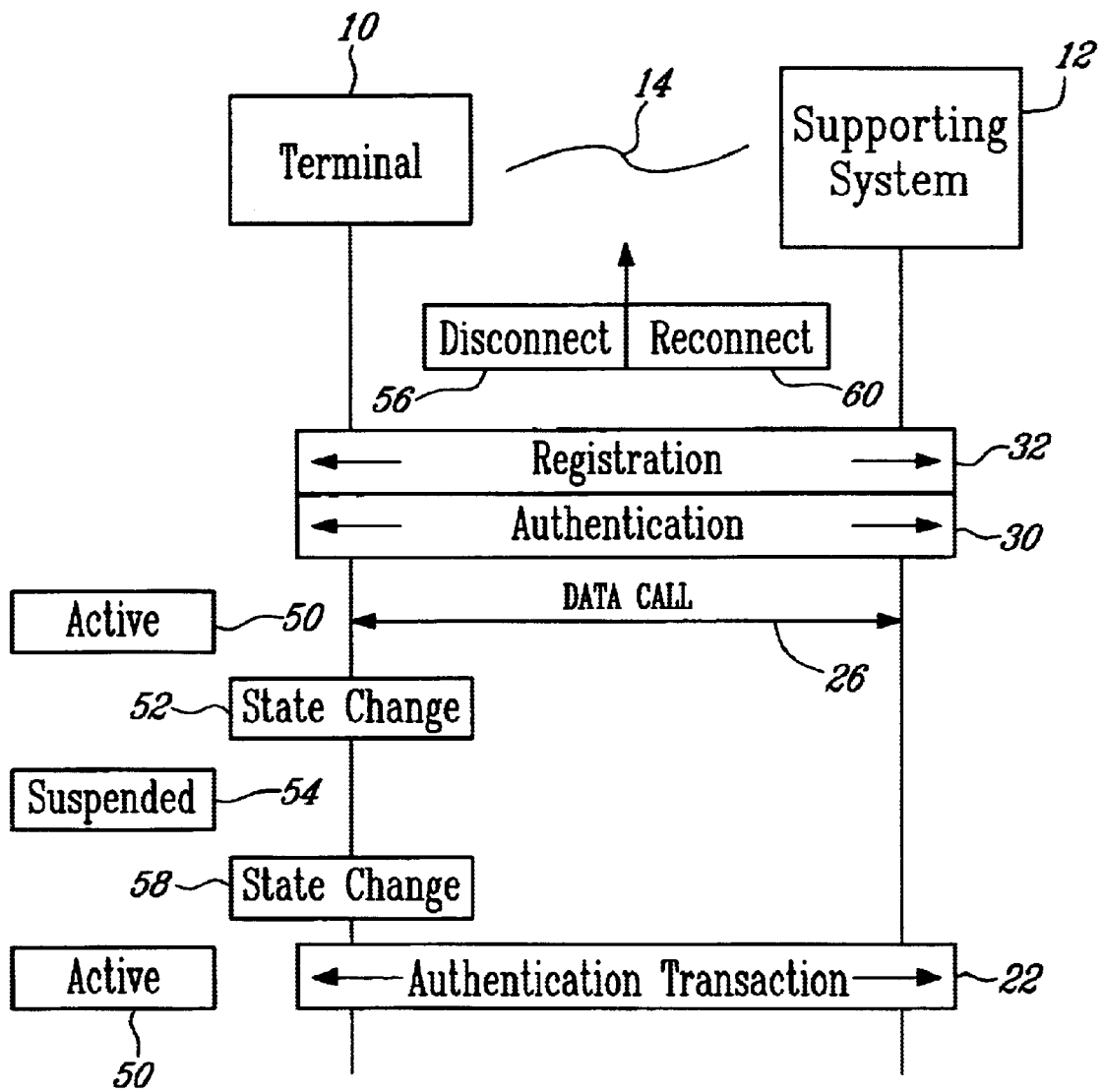

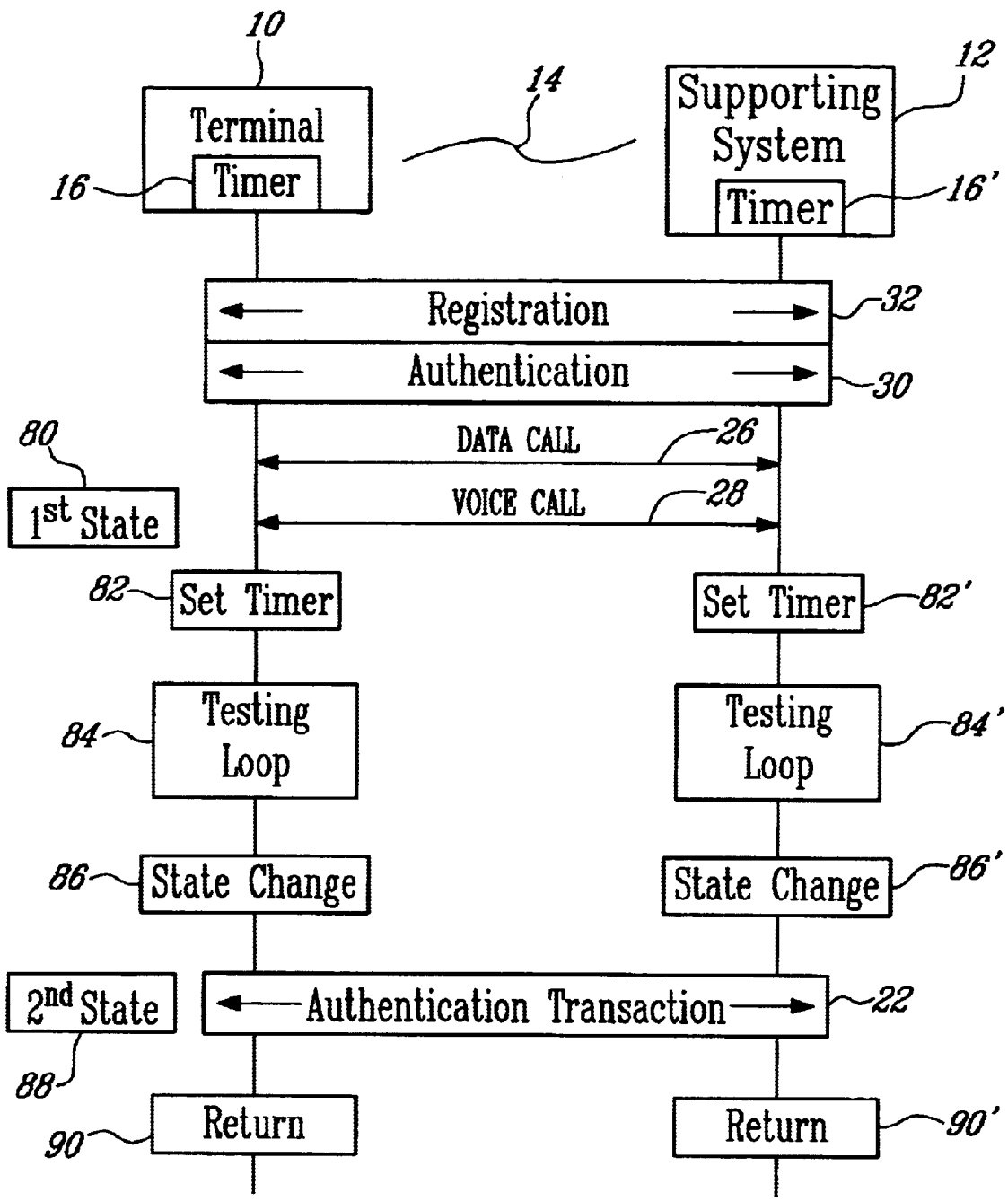

TERMINAL AUTHENTICATION PROCEDURE TIMING FOR DATA CALLS

BACKGROUND OF THE INVENTION

1. Technical Field of the Invention

The present invention relates to authentication procedures for terminals operating within a wireless communications system and, in particular, to the timing of terminal authentication procedure occurrence when engaging in a data call.

2. Description of Related Art

It is imperative in a wireless (for example, cellular) communications system that the system ensure that its services are being provided only to legitimate subscribers. The main reason for this is that the wireless radio communications media used for transmission to and from subscribers is particularly sensitive to eavesdropping (interception) of communications signals and misuse (stealing) by unauthorized users. It is common for the system to employ security functions to protect the information conveyed over the system and control access to the system. The most commonly utilized security mechanism for the protection of information is encryption, and the most commonly utilized security mechanism for access control is authentication. The term "authentication" refers to a process or procedure for exchanging information between a subscriber terminal (such as a mobile station) and system equipment (such as a base station) for the purpose of enabling the system to confirm the identity of the subscriber terminal and guarantee that only legitimate identified subscribers have access to system resources. Only when such identity is confirmed will the subscriber terminal be given access to valuable system resources like the air interface.

Generally, a wireless communications system authenticates a subscriber terminal by comparing so-called "shared secret data" (SSD) stored in the terminal with corresponding shared secret data stored in the system. The shared secret data stored in the subscriber terminal is derived from a combination of terminal identifying data, random data supplied by the system, and a private authentication key (A-Key). The subscriber terminal identification data may include an electronic serial number (ESN) which uniquely identifies the terminal to any system, and which includes the identity of the manufacturer of the terminal and the serial number assigned by the manufacturer to that terminal, plus a mobile identification number (MIN) which is derived from the directory telephone number of the subscriber terminal. The private authentication key is a secret number known only by the subscriber terminal and the "home" system for that terminal, and is used as an encryption key to encrypt various data. The system periodically generates and broadcasts a random number (RAND) to all served terminals. When a subscriber terminal seeks to utilize the system, it uses the received RAND, its assigned A-Key, its electronic serial number and its mobile identification number, construct a signed response. This signed response is then transmitted to the system (for example, via a base station). At the same time, the system retrieves the values of the ESN, MIN and A-Key for that subscriber terminal from its data base, and generates an expected signed response value to the same random number (RAND) using the retrieved values. Upon receipt of the signed response from the subscriber terminal, the system compares the received response to its generated expected signed response, and if the responses are the same, authentication of the subscriber terminal is confirmed and access is granted to system resources.

In conventional operation, the authentication process is performed based on terminal access to the system, for example, at subscriber terminal registration, at call initiation and at call delivery. Once authenticated in connection with a terminal access, no further authentication in connection with that same access is typically performed. With respect to engaging in a voice call, the subscriber terminal operates in two states: a null state (where it is idle awaiting use); and an active state (where it is used to engage in the call). Because of the limited number of states, and further because voice calls are often limited in length of time, the conventional terminal access related authentication process timing triggers (for example, at call initiation/delivery) provide sufficient security to not only ensure subscriber terminal identity but also ensure against unauthorized access to (i.e., stealing of) the air interface resource.

With respect to a data call, however, the conventional terminal access authentication process timing triggers may not provide a sufficient level of security. One reason for this is that data calls can extend over an extended period of time (often much longer than a typical voice call). These extended periods of time present a greater window of opportunity, following an initial successful authentication at data call set-up (i.e., terminal access), for an unauthorized user to illicitly access the system through the established authenticated connection. Another reason for this is that the subscriber terminal monitors whether it is actively sending or receiving data and, when a data transfer has not occurred within a certain period of time, switch to an operating state where the air interface resource is temporarily disconnected but the non-air interface resources remain connected, supporting the data call. When the subscriber terminal is in this suspended air interface state, an unauthorized user would be presented with an opportunity to illicitly access the system through the established authenticated connection.

It is accordingly recognized that an enhancement to, or replacement for, the conventional subscriber terminal access triggers for engaging in the authentication procedure is needed to account for the noted special concerns over the way data calls are handled.

SUMMARY OF THE INVENTION

An authentication procedure with a supporting wireless communications system is initiated by a subscriber terminal in response to either a timer expiration based trigger, a state change based trigger, or a combination timer/state based trigger.

With respect to the timer expiration based trigger, a countdown timer is set by either the subscriber terminal or the supporting system and thereafter monitored for expiration. Responsive thereto, an authentication procedure transaction is performed by the subscriber terminal with its supporting wireless communications system regardless of the current operating state of the terminal.

With respect to the state change based trigger, the subscriber terminal monitors for any transition from an operating state wherein use of an air interface connection with the supporting system has been suspended. Responsive thereto, the subscriber terminal initiates an authentication procedure transaction with its supporting wireless communications system.

With respect to the combination timer/state based trigger, the subscriber terminal sets a countdown timer and monitors for an operating state transition that occurs subsequent to timer expiration. Responsive thereto, an authentication procedure transaction is performed by the subscriber terminal with its supporting wireless communications system.

In a preferred embodiment, the authentication procedure triggers of the present invention are implemented solely with respect to subscriber terminal operation for data calls. It is understood, however, that the timer based trigger and combination timer/state based trigger may be equally well applied to subscriber terminal operation for voice calls.

In another preferred embodiment, the authentication procedure triggers of the present invention are implemented as a supplementary feature to conventional terminal access authentication procedures. It is understood, however, that the authentication procedure triggers of the present invention may alternatively be implemented as a replacement for conventional terminal access authentication procedures.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1 is a nodal operation and flow diagram for a first embodiment timer based trigger for authentication;

FIG. 2 is a nodal operation and flow diagram for a second embodiment state change based trigger for authentication; and FIG. 3 is a nodal operation and flow diagram for a third embodiment combination timer/state based trigger for authentication.

DETAILED DESCRIPTION OF THE DRAWINGS

With reference to FIGS. 1–3, a subscriber terminal 10 (comprising, for example, a cellular mobile station or its equivalent device configured for radio communication) is served for communication (either voice or data) by a wireless communications system 12 over an air interface 14. The wireless-communications system 12 may comprise a network configured in accordance with and/or supporting any one or more, as appropriate, of the following: time division multiple access (TDMA), global system for mobile communications (GSM), personal communications system (PCS), code division multiple access (CDMA), wide-band CDMA (WCDMA), general packet radio service (GPRS), enhanced data rates for global evolution (EDGE), and the like. Although not specifically shown, the wireless communications system 12 includes the interconnected network nodes (such as radio base stations, base station controllers, mobile switching centers, visitor location registers, home location registers, authentication centers, billing centers, service control points, service switching points, intelligent peripherals, network management systems, and the like) necessary to support the provision of wireless mobile voice and data communications services to the subscriber terminal 10. The architectural and implementation details for the supporting wireless communications system 12 are well known to those skilled in the art and thus detailed description of the same is not believed to be required for an understanding of the authentication procedures of the present invention.

Reference is now made to FIG. 1 wherein there is shown a nodal operation and flow diagram for a first embodiment timer based trigger for authentication. The subscriber terminal 10 sets a timer 16 in action 18 with a certain measured time period and executes a testing loop in action 20 to detect expiration of that time period. As one option, the set timer action 18 may choose the length of the measured time period. As another option, a resetting of the timer 16 in this scenario may then occur (as generally indicated at 34) responsive to each state transition from the suspended state to the active state (instead of resetting responsive to the expiration of the measured time period). Responsive to such time period expiration, the subscriber terminal 10 engages in an authentication transaction 22 (i.e., a message exchange and appropriate data processing action needed to authenticate the terminal) with the supporting wireless communications system 12, and returns 24 to action 18 to re-set the timer 16. Thus, the timer based trigger procedure implements an authentication transaction 22 once every certain time period as measured by the timer 16.

As an alternative, supporting communications system 12 may maintain and monitor a timer 16'. In this way, the system 12 sets the timer 16' in action 18' with a certain measured time period and executes a testing loop in action 20' to detect expiration of that time period. Responsive to such time period expiration, the system 12 orders the subscriber terminal 10 to engage in an authentication transaction 22 with the supporting wireless communications system 12, and returns 24' to action 18' to re-set the timer 16'. The order may be conveyed to the subscriber terminal 10 using a known registration command message (such as, for example, a unique challenge message in IS-95) supported by the air interface 14 specification. Thus, the timer based trigger procedure implements an authentication transaction 22 once every certain time period as measured by the timer 16'.

Preferably, this timer based trigger procedure is continually implemented regardless of the "turned-on" operational state of the subscriber terminal. Thus, the timer 16 or 16' will be set and monitored, with expiration triggering the authentication transaction 22, no matter whether the turned on subscriber terminal is in the idle (or null or dormant) state awaiting use, the active (on call) state engaging in a communication, or the suspended (or stand-by or held) state where data transfer has not recently occurred and the supporting air interface resource has been temporarily disconnected but the non air interface resources remain connected, supporting the data call. The purpose of the authentication transaction 22 when the subscriber terminal 10 is in the active state is accordingly to confirm subscriber terminal identity and guarantee that only legitimate identified subscriber terminals have access to system 12 resources (like the air interface 14). Furthermore, the purpose of the authentication transaction 22 when the subscriber terminal 10 is in the turned-on non-active state is to confirm that the subscriber terminal is still present and available, confirm subscriber terminal identity and guarantee that only legitimate identified subscriber terminals have access to system 12 resources.

The timer based trigger procedure is preferably implemented solely with respect to subscriber terminal operation while in a data call 26. It is understood, however, that the timer based trigger procedure may be equally well applied to subscriber terminal operation while in a voice call 28 exceeding a certain duration.

In a preferred embodiment, the timer based trigger authentication procedure is implemented as a supplementary feature to conventional terminal access authentication procedures. In this regard, the procedure is implemented following an initial authentication transaction 30 occurring at subscriber terminal registration 32 or set-up of the data call 26 or voice call 28. It is understood, however, that the timer based trigger authentication procedure may alternatively be implemented as a replacement for conventional terminal access triggers to the authentication transaction 30.

When engaged in a data call 26, and if a data transfer has not recently occurred, the subscriber terminal 10 may proceed through a state change from the active state to a suspended (or stand-by or held) state where the supporting air interface resource is temporarily disconnected but the non-air interface resources remain connected, supporting the data call. If presence in this suspended state lasts for an excessively long time, it is possible that the timer 16 or 16' will expire several times, with each expiration forcing the performance of an authentication transaction 22. It would be beneficial to avoid such situations where the only data exchange over the air interface 14 comprises authentication transaction 22 related data. Accordingly, the subscriber terminal 10 or system 12 may dynamically change the length of the measured time period based on historical data relating to the terminal's movement into and out of the suspended state. In this way, the timer 16 or 16' becomes sensitive to how frequently the timer expires in comparison to how frequently the subscriber terminal moves into and out of the active state. Responsive thereto, the measured time period may be adapted to gradually increase if the subscriber terminal remains in the suspended state for an excess period, or alternatively to adapt to any determined pattern in the active state (air interface re-connection) intervals. As one option, the set timer action 18 or 18' may choose the length of the measured time period. As another option, a resetting of the timer 16 or 16' in this scenario may then occur (as generally indicated at 34) responsive to each state transition from the suspended state to the active state (instead of resetting responsive to the expiration of the measured time period)

Reference is now made to FIG. 2 wherein there is shown a nodal operation and flow diagram for a second embodiment state change based trigger for authentication. The subscriber terminal 10 is in an active state 50 and engaged in a data call 26. At some point in time, the terminal 10 detects that a data transfer has not occurred for a certain period of time and proceeds through a state change (action 52) from the active state 50 to a suspended (or stand-by, dormant or held) state 54 where the supporting air interface 14 resource is temporarily disconnected as generally indicated at 56 but the non-air interface resources remain connected, supporting the. data call. Sometime thereafter, a data transfer is needed and the subscriber terminal 10 transitions through another state change (action 58) from the suspended state 54 back to the active state 50 where the supporting air interface 14 resource is reconnected as generally indicated at 60 (to continue supporting the data call). The subscriber terminal 10 triggers off that transition back to the active state 50 and responds by implementing an authentication transaction 22 with the supporting wireless communications system 12.

It is preferred that this state based trigger procedure be implemented responsive to a transition from any supported state to the active state. It will be understood, however, that the trigger for implementing an authentication transaction 22 with the supporting wireless communications system 12 may be specific to certain ones of these state changes and may, if deemed beneficial, be triggered with respect to state changes that do not necessarily implicate the active state.

In a preferred embodiment, the state based trigger authentication procedure is implemented as a supplementary feature to conventional terminal access authentication procedures. In this regard, the procedure is implemented following an initial authentication transaction 30 occurring at subscriber terminal registration 32 or set-up of the data call 26. It is understood, however, that the timer based trigger authentication procedure may alternatively be implemented as a replacement for conventional terminal access authentication procedures to the authentication transaction 30.

Reference is now made to FIG. 3 wherein there is shown a nodal operation and flow diagram for a third embodiment combination timer/state based trigger for authentication. The subscriber terminal 10 is in a first state 80, and then sets a timer 16 in action 82 with a certain measured time period. A testing loop is then executed in action 84 to detect whether the time period has expired and the subscriber terminal 10 has moved from the first state 80. Responsive to such time period expiration, and the movement (state change 86) of the subscriber terminal 10 to a second state 88 (as determined by the testing loop), an authentication transaction 22 is performed with the supporting wireless communications system 12, and the process returns 90 to action 82 to re-set the timer 16. Thus, the combination timer/state based trigger procedure implements an authentication transaction 22 once every certain time period as measured by the timer 16 provided the subscriber terminal 10 has engaged in a state change.

As an alternative, supporting communications system 12 may maintain and monitor a timer 16'. In this way, the system 12 sets the timer 16' in action 82' with a certain measured time period and executes a testing loop in action 84' to detect expiration of that time period followed by a transition (state change 86') to the second state 88. Responsive to such time period expiration and transition, the system 12 orders the subscriber terminal 10 to engage in an authentication transaction 22 with the supporting wireless communications system 12, and returns 90' to action 82' to re-set the timer 16'. The order may be conveyed to the subscriber terminal 10 using a known registration command message (such as, for example, a unique challenge message in IS-95) supported by the air interface 14 specification.

The combination timer/state based trigger procedure is preferably implemented solely with respect to subscriber terminal operation for a data call 26. It is understood, however, that the timer/state based trigger procedure may be equally well applied to subscriber terminal operation for a voice call 28.

In a preferred embodiment, the combination timer/state based trigger authentication procedure is implemented as a supplementary feature to conventional terminal access authentication procedures. In this regard, the procedure is implemented following an initial authentication transaction 30 occurring at subscriber terminal registration 32 or set-up of the data call 26 or voice call 28. It is understood, however, that the combination timer/state based trigger authentication procedure may alternatively be implemented as a replacement for conventional terminal access triggers to the authentication transaction 30.

It is preferred that this combination timer/state based trigger procedure be implemented responsive to any state transition with respect to subscriber terminal operation. However, it is recognized that the procedure may be especially useful at certain specific state transitions (when combined with a time expiration) such as at a transition from the suspended state to the active state.

In the methods of FIGS. 1–3, the authentication transaction 22 may comprise any set of message exchanges and operations related thereto effectuated within the communications system 12 for the purpose of authenticating an accessing subscriber terminal. These transactions 22 would include, but are not limited to, the known authentication transaction standards established in connection with wireless cellular telephone service within the TDMA, PCS, GSM, CDMA, WCDMA, GRPS, EDGE, and the like, networks.

Although preferred embodiments of the method and apparatus of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A method for triggering mobile station authentication in a wireless communications system, comprising the steps of:
    (a) setting a timer to measure a predetermined time period responsive to a change in operational state of the mobile station;
    (b) monitoring for expiration of that predetermined time period; and
    (c) engaging in an authentication transaction between the mobile station and the wireless communications system in response to timer expiration.

2. The method of claim 1 wherein the steps (a)–(c) are performed while the mobile station is engaged in a voice call.

3. The method of claim 1 wherein the steps (a)–(c) are performed while the mobile station is engaged in a data call.

4. The method of claim 1 wherein the steps (a)–(b) are performed by the mobile station itself.

5. The method of claim 1 wherein the steps (a)–(b) are performed by the wireless communications system, the method further including the step of sending a command from the wireless communications system to the mobile station ordering the mobile station to perform step (c).

6. The method of claim 1 wherein step (a) is performed responsive to completion of a prior step (c).

7. The method of claim 1 wherein the change in operational state of the mobile station is from an active state to a suspended state.

8. A method for triggering mobile station authentication in a wireless communications system, comprising the steps of:
    setting up a data call between the mobile station and the wireless communications system;
    placing the mobile station into a first operational state wherein an air interface connection with the wireless communications system is disconnected but the non-air interface resources remain connected supporting that data call;
    monitoring for a change from the first operational state to a second operational state wherein the air interface connection is re-connected to support the data call; and
    engaging in an authentication transaction between the mobile station and the wireless communications system in response to the monitored change in state.

9. A method for triggering mobile station authentication in a wireless communications system, comprising the steps of:
    setting up a call between the mobile station and the wireless communications system wherein the mobile station is in a first operational state in connection with supporting that call; and
    while that call continues, performing the steps of:
        (a) setting a timer to measure a predetermined time period;
        (b) monitoring for expiration of that predetermined time period;
        (c) monitoring for a change from the first operational state to a second operational state in connection with supporting that call following expiration of the monitored time period; and
        (d) engaging in an authentication transaction between the mobile station and the wireless communications system in response to the monitored change in state.

10. The method of claim 9 wherein the call comprises a voice call.

11. The method of claim 9 wherein the call comprises a data call.

12. The method of claim 9 wherein the steps (a)–(c) are performed by the mobile station itself.

13. The method of claim 9 wherein the steps (a)–(c) are performed by the wireless communications system, the method further including the step of sending a command from the wireless communications system to the mobile station ordering the mobile station to perform step (d).

14. The method of claim 9 wherein the call is a data call, and wherein the first operational state comprises a state where an air interface connection with the wireless communications system is disconnected but the non-air interface resources remain connected supporting the data call, and wherein the second operational state comprises a state where the air interface connection is re-connected to support the data call.

15. A system comprising a mobile station and a supporting wireless communications system, the system operating in response to a change in operational state of the mobile station to set a timer to measure a predetermined time period and engage in an authentication transaction between the mobile station and the supporting wireless communications system in response to a monitored expiration of that measured predetermined time period.

16. The system of claim 15 wherein the timer is maintained in the mobile station itself.

17. The system of claim 15 wherein the timer is maintained in the supporting wireless communications system, and wherein the supporting wireless communications system sends a command to the mobile station ordering the mobile station to perform an authentication transaction.

18. A system comprising a mobile station and a supporting wireless communications system, wherein the mobile station in engaged in a data call, the system operating to place the mobile station into a first operational state wherein an air interface connection with the wireless communications system is disconnected but the non-air interface resources remain connected supporting the data call, and engage in an authentication transaction between the mobile station and the wireless communications system in response to a monitored change from the first operational state to a second operational state wherein the air interface connection is re-connected to support the data call.

19. A system comprising a mobile station and a supporting wireless communications system, wherein the mobile station is engaged in a call and is in a first operational state in connection with supporting that call, the system operating while that call continues to set a timer to measure a predetermined time period and engage in an authentication transaction between the mobile station and the wireless communications system in response to a monitored change from the first operational state to a second operational state in connection with supporting that call following expiration of the monitored time period.

20. The system of claim 19 wherein the timer is maintained in the mobile station itself.

21. The system of claim 19 wherein the timer is maintained in the wireless communications system, and wherein the supporting wireless communications system sends a command to the mobile station ordering the mobile station to perform an authentication transaction.

22. The system of claim 19 wherein the call is a data call, and wherein the first operational state comprises a state where an air interface connection with the wireless communications system is disconnected but the non-air interface resources remain connected supporting the data call, and wherein the second operational state comprises a state where the air interface connection is re-connected to support the data call.

* * * * *